United States Patent
Huang

(10) Patent No.: US 7,301,449 B2
(45) Date of Patent: Nov. 27, 2007

(54) SIGNAL DETECTING SYSTEM USING TELEPHONE LINES FOR SIGNAL TRANSMISSION

(76) Inventor: Dennis Huang, 1 Fl., No. 1, Lane 9, Ningpo E. St., Taipei (TW)

(*) Notice: Subject to any disclaimer, the term of this patent is extended or adjusted under 35 U.S.C. 154(b) by 149 days.

(21) Appl. No.: 11/362,778

(22) Filed: Feb. 28, 2006

(65) Prior Publication Data

US 2007/0018808 A1    Jan. 25, 2007

(30) Foreign Application Priority Data

Jul. 25, 2005    (TW) .............................. 94216549 U

(51) Int. Cl.
*G08B 1/00* (2006.01)
(52) U.S. Cl. .................. 340/531; 340/506; 348/207.99
(58) Field of Classification Search ................ 340/531, 340/506, 539.1, 545.3, 691.6, 384.1; 455/73; 348/207.99
See application file for complete search history.

(56) References Cited

U.S. PATENT DOCUMENTS

| 6,665,079 | B1 * | 12/2003 | Tocci et al. ................. 356/614 |
| 2004/0046871 | A1 * | 3/2004 | Ichikawa et al. ...... 348/207.99 |
| 2005/0075117 | A1 * | 4/2005 | Jang ........................ 455/456.4 |

* cited by examiner

*Primary Examiner*—Phung T. Nguyen
(74) *Attorney, Agent, or Firm*—Bacon & Thomas, PLLC

(57) ABSTRACT

A signal detecting system using telephone lines for signal transmission includes at least one detecting device, at least one alarm device, and at least one telephone line. Each detecting device includes an RF receiver, a filter, a signal amplifier, a direct converting receiver, and a level converter. Each alarm device includes a controller and a warning device. By means of the signal detecting system, abnormal signals (such as signals from a pinhole camera) around a detecting area can be detected and transmitted through telephone lines, and thus activate a warning device.

9 Claims, 3 Drawing Sheets

SIGNAL DETECTING SYSTEM USING TELEPHONE LINES FOR SIGNAL TRANSMISSION

BACKGROUND OF THE INVENTION

1. Field of the Invention

The present invention relates to signal detecting systems and, more particularly, to a signal detecting system using telephone lines for signal transmission.

2. Description of Related Art

In recent years, hidden or pinhole cameras have been used for immoral spying on private affairs in houses or certain locations such as hotels. The behavior immoral spying with hidden or pinhole cameras is a serious offence against public interests, particularly privacy and intimacy.

To solve the problems of immoral spying with hidden or pinhole cameras, a "System and Method for Preventing to Use Portable Terminal Having Camera As Secret Spy Camera," as disclosed in U.S. Publication No. 2005/0075117 A1, uses a Radio Frequency Identification (RFID) module to pause the camera function of a portable terminal, such that the camera function can be automatically limited at a specific place to prevent illegal photographing. Nevertheless, radio frequency through wireless transmission can be easily disrupted by terrain or topography, and as such, the effectiveness of camera function pausing is greatly reduced. Besides, in receiving, transmitting or identifying signals, it is necessary to employ a specific device, accompanied with an RFID technique but this increases the cost of system construction and the complexity of design.

SUMMARY OF THE INVENTION

It is therefore an object of the present invention to provide a signal detecting system using telephone lines for signal transmission, thereby preventing immoral spying via a concealed camera. Furthermore, by using telephone lines for signal transmission, the shortcoming of topographical interference on signal transmission can be overcome.

The present invention relates to a signal detecting system using telephone lines for signal transmission, including at least one detecting device, at least one alarm device, and at least one telephone line, wherein the at least one detecting device and the at least one alarm device transmit signals, which are detected by the at least one detecting device, through the use of the at least one telephone line.

The detecting device includes an RF receiver, a filter, a signal amplifier, and a direct converting receiver, wherein the RF receiver receives outer RF signals, the filter proceeds a filtering process on the outer RF signals being received, the signal amplifier, after amplifying and processing the filtered RF signals, outputs the RF signals, and the direct converting receiver converts directly the amplified RF signals into baseband signals. A level converter is provided for comparing the baseband signal with a predetermined level, and when the baseband signal is greater than the predetermined level, the level converter transmits the baseband signal to the alarm device through the telephone lines.

The alarm device includes a controller and a warning device, wherein the controller and the warning device are electrically connected with each other. Whenever the level converter of the detecting device transmits a baseband signal, the controller of the alarm device, through telephone lines, is activated, and so is the warning device of the alarm device.

Accordingly, by means of the signal detecting system according to the present invention, abnormal signals (such as the signals from a pinhole camera) around a detecting area can be detected. To the effect, in the case of abnormal signals, the detecting device transmits, through telephone lines, a warning signal to the alarm device, and thus activates the warning device, such that personnel can be alerted.

Further, the detecting device according to the present invention can be equipped with a microprocessor and a power control circuit, wherein the microprocessor is electrically connected to the power control circuit. The alarm device may include a power controller and a level regulator, so that when the detecting device acts abnormally or fails, the power of the detecting device can be controlled and shut off from the end of the alarm device, and thus a dual-way control can be achieved. Besides, by adjusting the level of the level regulator the sensitivity of the detecting device can be varied.

The signal detecting system according to the present invention may further include at least one signal connecting port for connecting at least one outer control device. As such, a user can record the detecting process and result, greatly enhance the functionality of the signal detecting system. Moreover, the detecting process and result can be transmitted to a remote end through the Internet so as to achieve a function of remote monitoring.

In the signal detecting system according to the present invention, a mode of multiple detecting devices incorporating with one alarm device may be adopted. In the case that the controller of the alarm device is equipped with a display, a real-time status of the detecting device can be clearly shown, thereby personnel can be alerted to any abnormal signal detected from each particular detecting device. By doing so, a redundant purchase on alarm devices can be avoided, and as a result, expenditure is minimized. On the other hand, a mode of one detecting device incorporating with one alarm device may be adopted.

Other objects, advantages, and novel features of the present invention will become more apparent from the following detailed description when taken in conjunction with the accompanying drawings.

DETAILED DESCRIPTION OF THE PREFERRED EMBODIMENT

Figure 1:
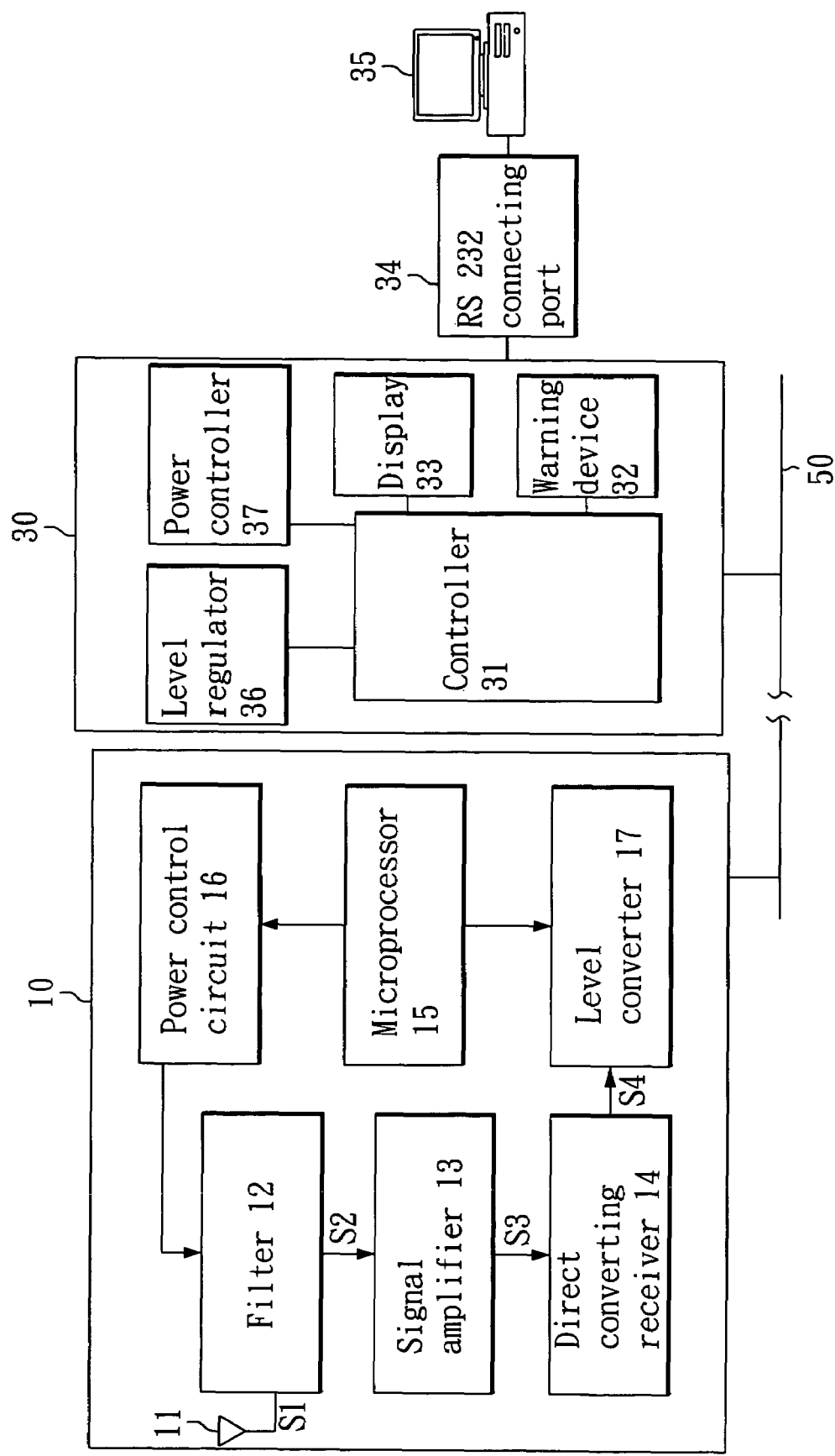
FIG. 1 is a block diagram showing the function of the first embodiment of the present invention.
Figure 2:
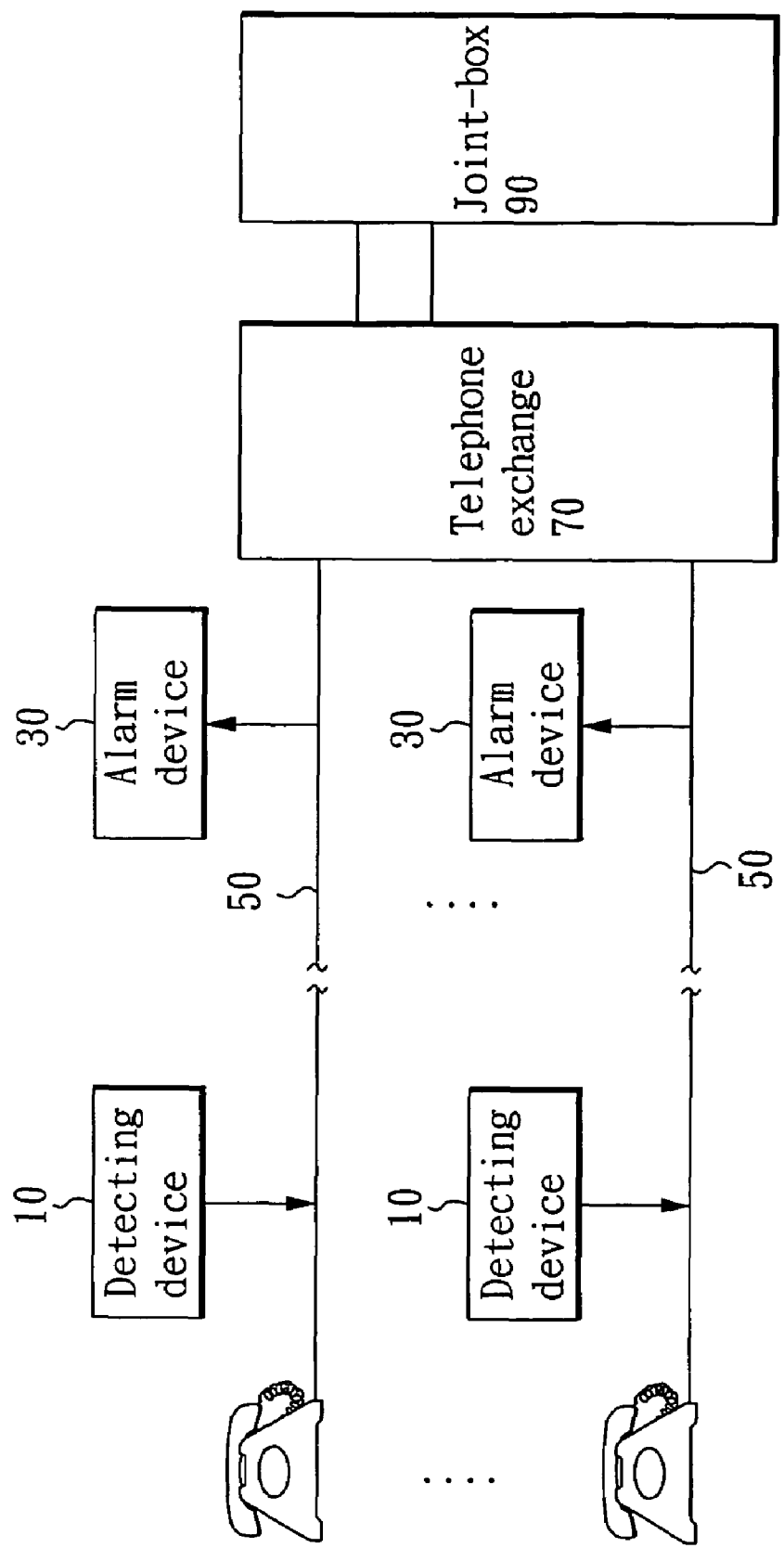
FIG. 2 shows a system construction of the first embodiment of the present invention.

Referring to FIGS. 1 and 2, the present invention relates to a signal detecting system using telephone lines for signal transmission, including a detecting device 10, an alarm device 30, and a telephone line 50, wherein the detecting device 10 transmits signals, which are detected by the detecting device 10, to the alarm device 30 through the use of the telephone line 50. In the first embodiment, the signal detecting system according to the present invention is applied in hotels, where the detecting device 10 is mounted in a hotel room and the alarm device 30 is arranged before the telephone exchange 70 of a telephone company's joint-box 90.

In the first embodiment, each of the detecting devices 10 includes an RF receiver 11, a filter 12, a signal amplifier 13, a direct converting receiver 14, and a level converter 17. The RF receiver 11 receives an outer RF signal S1 having a frequency ranging from 30 MHz to 6 GHz. The filter 12 proceeds a filtering process on the outer RF signal S1 being received, and transmits a filtered RF signal S2 to the signal amplifier 13. After amplifying and processing the filtered RF signal S2, the signal amplifier 13 outputs an amplified RF signal S3 to the direct converting receiver 14. The direct converting receiver 14 receives the amplified and processed RF signal S3 and converts directly the RF signal S3 into a baseband signal S4. The level converter 17 is provided for comparing the baseband signal S4 with a predetermined level, and when the baseband signal S4 is greater than the predetermined level, the level converter 17 transmits the baseband signal S4 to the alarm device 30 through the telephone line 50.

Each of the alarm devices 30 includes a controller 31 and a warning device 32, wherein the controller 31 and the warning device 32 are electrically connected with each other. Whenever an abnormal signal is produced around a detecting area, the detecting device 10 transmits, through a telephone line, a warning signal to the controller 31 of the alarm device 30, and thus activates the warning device 32.

In the first embodiment, the warning device 32 adopts a buzzer 32 so as to make a humming sound. Other equivalent devices, of course, can be used. Further, a liquid crystal display (LCD) 33 is used for directly manifesting the area of abnormal signals. Similarly, an LED or other equivalents can be used. As such, sound and light warning effects can be obtained.

Therefore, by using the signal detecting system according to the present invention, an abnormal signal (such as a pinhole camera spying signal) around a detecting area can be detected, and through the LCD 33 or the buzzer 32, hotel staff can be alerted. Consequently, time and labor can be saved when particular hotel rooms can be identified and scanned.

In the first embodiment, the detecting device 10 according to the present invention can be equipped with a microprocessor 15 and a power control circuit 16, wherein the microprocessor 15 is electrically connected to the power control circuit 16. The alarm device 30 according to the present invention may include a power controller 37 and a level regulator 36, so that when the detecting device 10 functions abnormally or fails, the detecting device 10 at a remote end can be shut off from the end of the alarm device 30, and thus a dual-way control can be achieved. Besides, by adjusting the level of the level regulator 36 the sensitivity of the detecting device 10 can be varied.

In the first embodiment of the present invention, the controller 31 of the alarm device 30 is connected to a host 35 through an RS-232 connecting port 34, and further through application software, a user can record the detecting data of the detecting devices 10. Moreover, a real-time status of each detecting device 10 can be transmitted to a remote end through the Internet so as to provide a remote monitoring.

Figure 3:
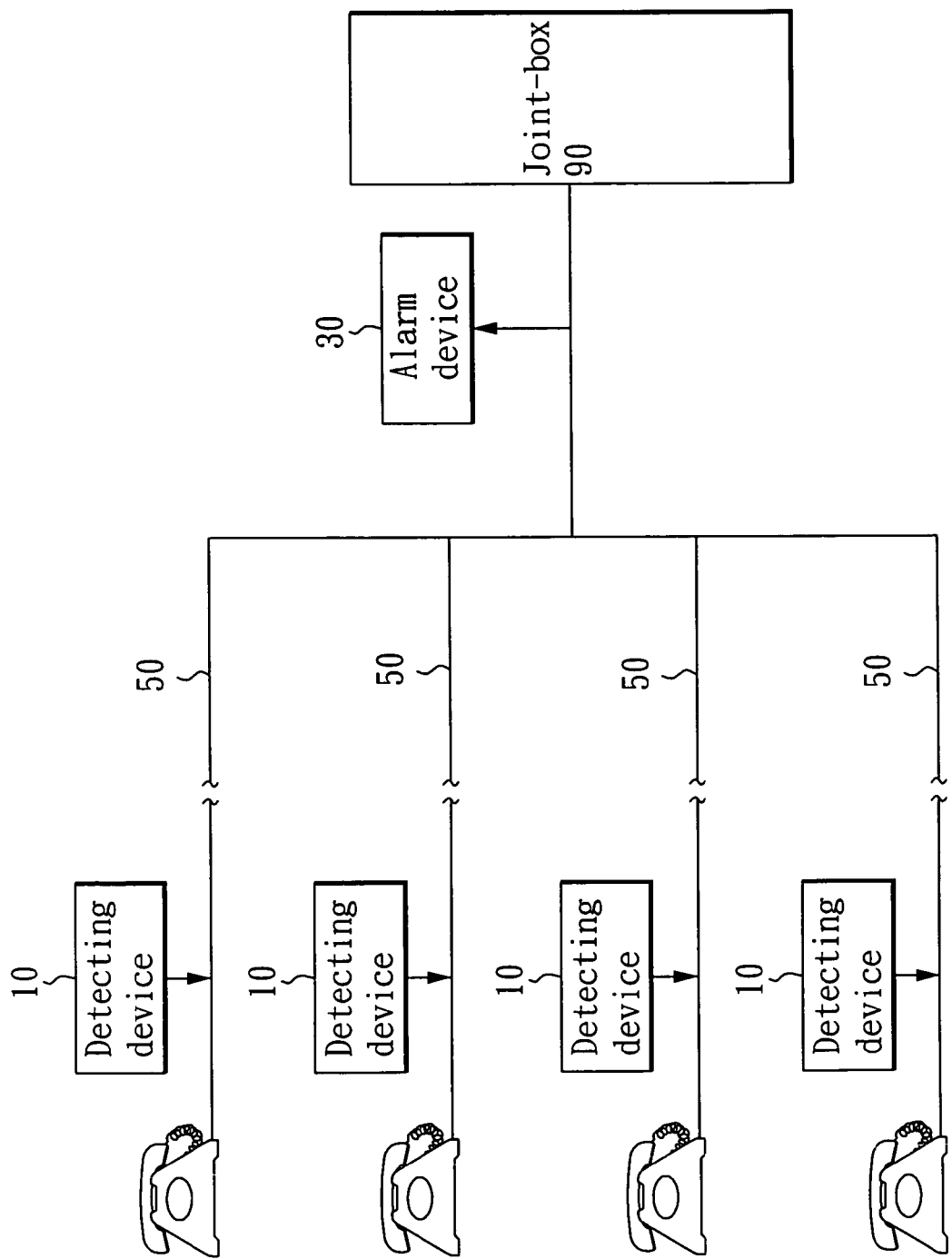
FIG. 3 shows a system construction of the second embodiment of the present invention.

Further, reference may be made to FIG. 3 showing a system construction of the second embodiment of the present invention. The principle of operation of the second embodiment has little significant difference to that of the first embodiment according to the present invention, with the only difference being in the construction of telephone systems, but having the same effectiveness achieved. In the first embodiment, the telephone exchange 70 is used for distributing the telephone lines 50 to extension lines, whereas in the second embodiment, telephone lines 50 are connected directly to the extension lines, and thus going through a telephone exchange 70 is not necessary. In the second embodiment, one telephone line 50 can, at the most, distribute to four extension lines, and thus can suitably be applied to houses or small companies. In practice, the detecting devices 10 are installed at the sites to be detected and then are connected to the telephone lines 50, thereafter to an alarm device 30 and to a telephone company's joint-box 90. Therefore, personnel in a telecommunication control room can monitor all the rooms to see if there is any abnormal signal, and thus the objective of detection can be achieved.

The present invention adopts a mode of multiple detecting devices 10 co-operating with one alarm device 30, where the alarm device 30 includes a controller 31 having a display 33 so as to show in real time the status of every detecting device 10, and as such, personnel can easily notice abnormal signals detected by particular detecting devices 10. In addition, a redundant purchase of alarm devices 30 can be avoided and thus cost is minimized. On the other hand, of course, a mode of one detecting device 10 co-operating with one alarm device 30 can be adopted.

Although the present invention has been explained in relation to its preferred embodiments, it is to be understood that many other possible modifications and variations can be made without departing from the scope of the invention as hereinafter claimed.

What is claimed is:

1. A signal detecting system using telephone lines for signal transmission, including at least one detecting device, at least one alarm device, and at least one telephone line, wherein the at least one detecting device and the at least one alarm device transmit signals, which are detected by the at least one detecting device, through the use of the at least one telephone line, each detecting device including:
   an RF receiver, for receiving an outer RF signal;
   a filter, for proceeding a filtering process on the outer RF signal;
   a signal amplifier, for receiving the filtered RF signal and, after amplifying and processing the RF signal, outputting the RF signal;
   a direct converting receiver, for receiving the amplified and processed RF signal and converting the RF signal into a baseband signal; and
   a level converter, for comparing the baseband signal with a predetermined level, and when the baseband signal is greater than the predetermined level, outputting the baseband signal; and
   each of the alarm devices including a controller and a warning device, wherein the controller and the warning device are electrically connected with each other, and when the level converter of the detecting device outputs the baseband signal, a controller of the alarm device, through telephone lines, is activated, and the warning device of the alarm device is activated at the same time as the controller.

2. The signal detecting system using telephone lines for signal transmission according to claim 1, wherein each detecting device further includes a microprocessor and a power control circuit, and wherein the microprocessor is electrically connected to the power control circuit.

3. The signal detecting system using telephone lines for signal transmission according to claim 1, wherein each alarm device includes a power controller and a level regulator.

4. The signal detecting system using telephone lines for signal transmission according to claim 1, wherein each alarm device includes a display.

5. The signal detecting system using telephone lines for signal transmission according to claim 1 further including at least one signal connecting port for connecting to at least one outer control device.

6. The signal detecting system using telephone lines for signal transmission according to claim 5, wherein the signal connecting port includes an RS-232 connecting port.

7. The signal detecting system using telephone lines for signal transmission according to claim 5, wherein the outer control device includes a computer.

8. The signal detecting system using telephone lines for signal transmission according to claim 1, wherein the RF signal receiver receives an RF signal having a frequency ranged from 30 MHz to 6 GHz.

9. The signal detecting system using telephone lines for signal transmission according to claim 1, wherein the warning device is a buzzer.

* * * * *